United States Patent

Dickey et al.

(10) Patent No.: US 9,213,626 B2
(45) Date of Patent: Dec. 15, 2015

(54) CONFIGURATION DATA BASED DIAGNOSTIC DATA CAPTURE

(71) Applicant: Hamilton Sundstrand Corporation, Windsor Locks, CT (US)

(72) Inventors: John A. Dickey, Rockford, IL (US); Michael Krenz, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 347 days.

(21) Appl. No.: 13/780,898

(22) Filed: Feb. 28, 2013

(65) Prior Publication Data
US 2014/0244893 A1 Aug. 28, 2014

(51) Int. Cl.
*G06F 12/00* (2006.01)
*G06F 12/02* (2006.01)
*G06F 11/30* (2006.01)

(52) U.S. Cl.
CPC ............ *G06F 12/0238* (2013.01); *G06F 11/30* (2013.01)

(58) Field of Classification Search
CPC ...... G06F 12/0238; G06F 11/30; G06F 12/02
USPC ................................................... 711/161, 162
See application file for complete search history.

(56) References Cited

U.S. PATENT DOCUMENTS

2011/0283070 A1* 11/2011 Rischar et al. ................ 711/162
2012/0317549 A1 12/2012 Cunningham et al.

FOREIGN PATENT DOCUMENTS

KR 200462760 Y1 10/2012

OTHER PUBLICATIONS

European Search Report dated Apr. 9, 2015, for corresponding European Application No. 14156543.

* cited by examiner

*Primary Examiner* — Matthew Bradley
(74) *Attorney, Agent, or Firm* — Kinney & Lange, P.A.

(57) ABSTRACT

A data capture system includes a processor instructed by configuration data that indicates a trigger event and data identifiers, a volatile memory that stores data based upon the data identifiers, and a non-volatile memory that stores contents of the volatile memory based upon detection of the trigger event by the processor. The data identifiers indicate data elements to be stored.

17 Claims, 3 Drawing Sheets

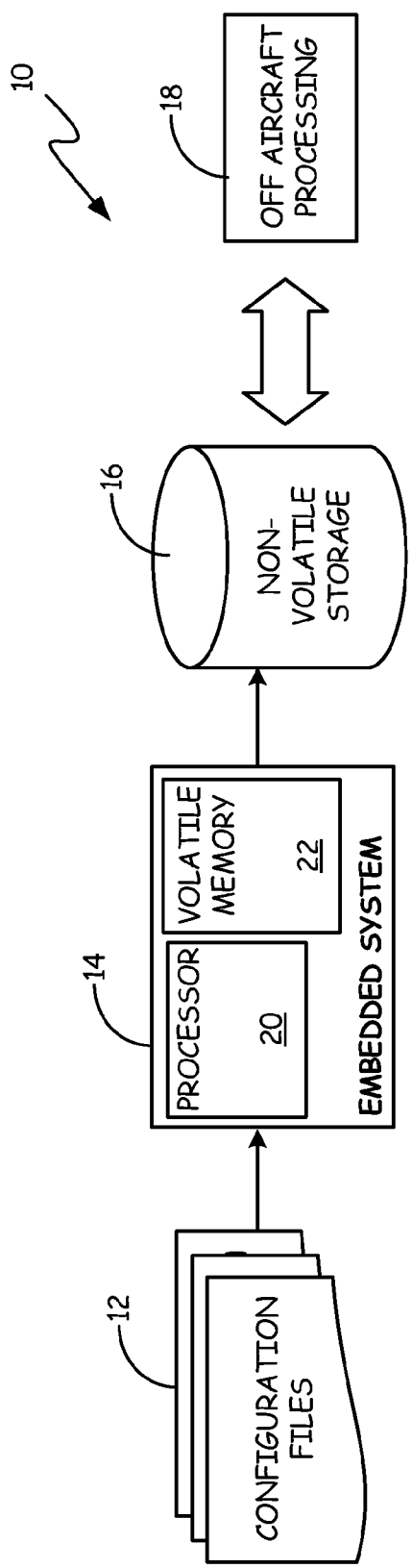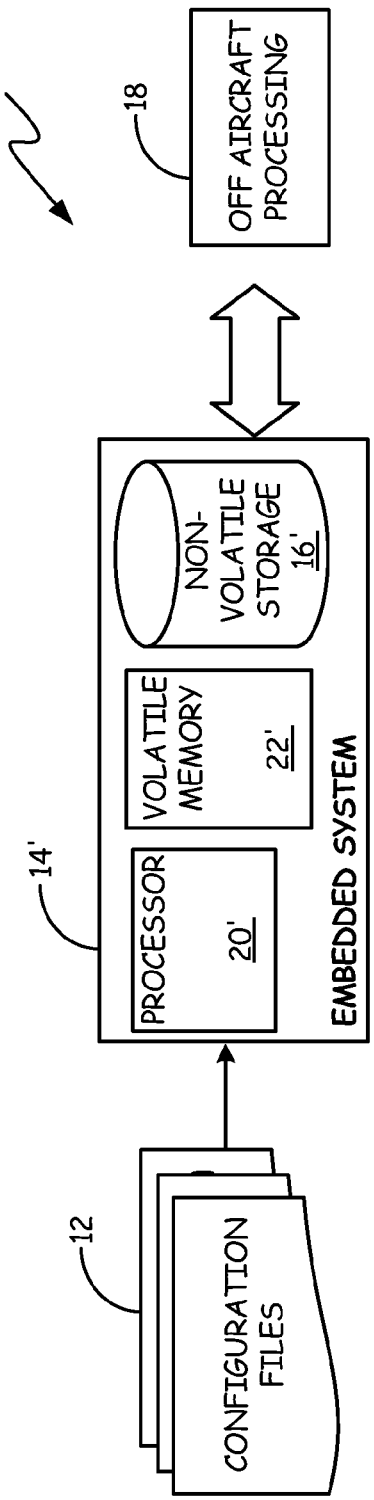

CONFIGURATION DATA BASED DIAGNOSTIC DATA CAPTURE

BACKGROUND

Modern electronic systems such as, for example, aircraft systems, perform diagnostic tests on most aspects of their operation. These tests are often performed at very high periodic rates resulting in the amount of data gathered far exceeding the capacity to either store all of the data locally or communicate the data locally or remotely. Often times only a subset of the captured information is of interest, and there is a desire to capture a longer or more frequent snapshot of the data of interest.

When, for example, a fault occurs, the system is often returned in order to diagnose and fix whatever caused the fault. In many cases, a fault is dependent upon several conditions at the time of the incident. The fault may also be intermittent, and only fail occasionally due to marginal characteristics. To determine the cause of the fault, the fault must first be reproduced in order to make appropriate measurements and isolate the issue. On intermittent or conditional dependent faults, it is very difficult to reproduce the issue without adequate data relating to the fault. Improved analysis is possible by capturing various data elements and/or sequences of analog samples to allow a limited reconstruction of the context of the situation at the time the fault was detected.

SUMMARY

A data capture system includes a processor, a volatile memory, and a non-volatile memory. The processor is instructed by configuration data that indicates a trigger event and data identifiers. The data identifiers indicate data elements to be stored. The volatile memory stores data based upon the data identifiers, and the non-volatile memory stores contents of the volatile memory based upon detection of the trigger event by the processor.

BRIEF DESCRIPTION OF THE DRAWINGS

FIGS. 1A and 1B are block diagrams illustrating configuration data based data capture systems.

DETAILED DESCRIPTION

Figure 2:
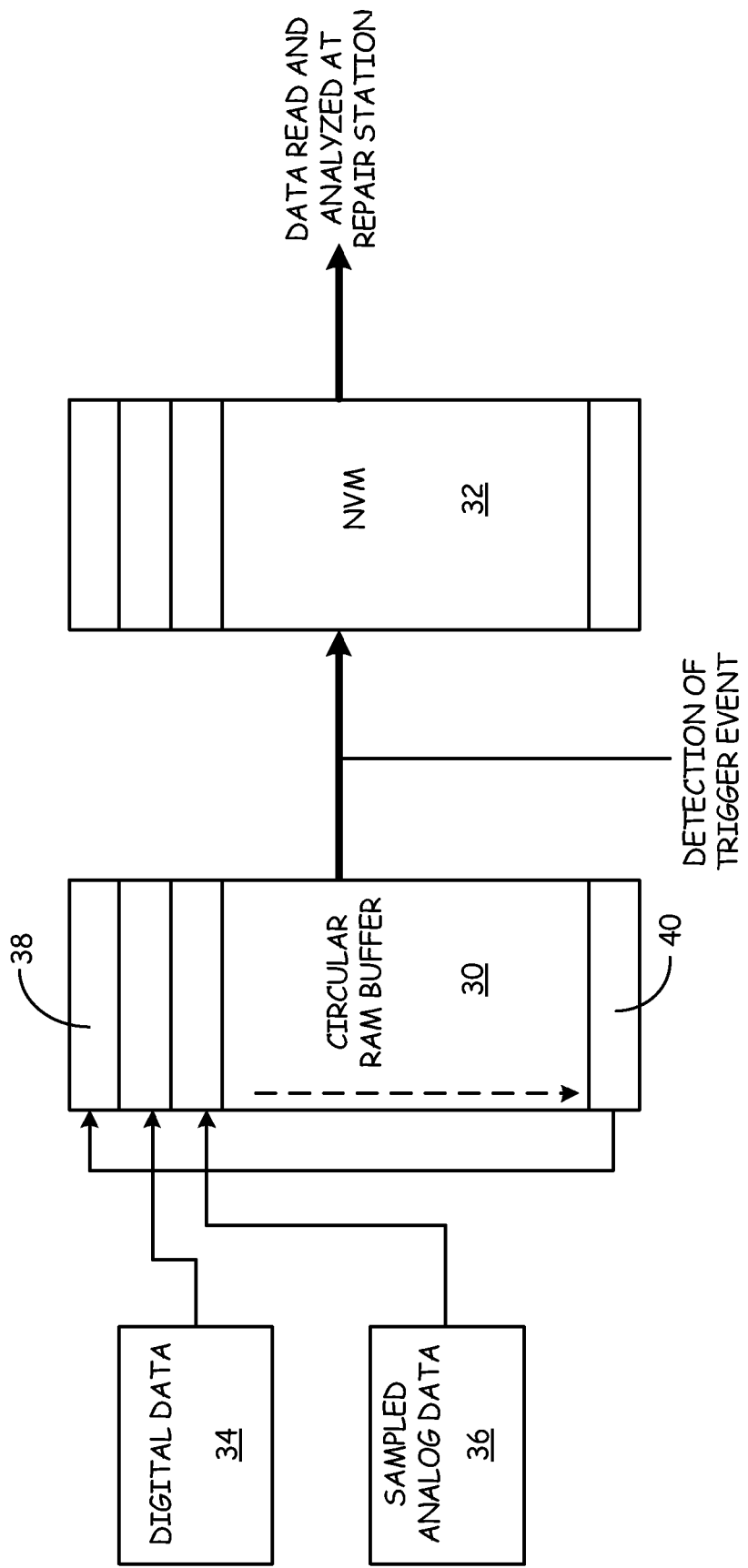
FIG. 2 is a data flow diagram illustrating a ring buffer and non-volatile memory of a data capture system.

The present invention relates to data capture, and in particular to a system and method for capturing diagnostic data based upon configuration data. Electronic systems such as, for example, solid state power controllers (SSPCs) onboard aircraft, include embedded systems. These systems include processors, non-volatile memories and volatile memories. Configuration data defines, among other things, trigger events, a period of data capture, and identifiers indicative of which data elements should be stored. A ring buffer is implemented in volatile memory to continuously store environment data as defined by the configuration data. The configuration data may be defined in, for example, a configuration file that may be loaded to the processor at any time. The data is continuously stored in the ring buffer until a trigger event occurs. Upon occurrence of a trigger event, data continues to be stored in the ring buffer in accordance with the period specified in the configuration data. After the period is up, the contents of the ring buffer are transferred to non-volatile memory. The embedded systems are configured to handle any configuration specified by the configuration data, so no code compilation is necessary and the configuration data may be instructed to the processor at any time.

FIGS. 1A and 1B are block diagrams illustrating configuration data based data capture systems 10 and 10', respectively. System 10 includes configuration data 12, embedded system 14, non-volatile storage 16, and off-aircraft processing 18. Embedded system 14 includes processor 20 and volatile memory 22. Embedded system 14 is any embedded system, such as, for example, a solid state power controller (SSPC) onboard an aircraft. Processor 20 is any programmable device such as, for example, a microprocessor or a field programmable gate array (FPGA). Volatile memory 22 may be implemented as, for example, dynamic random access memory (DRAM), static random access memory (SRAM), or any other known volatile memory. Non-volatile storage 16 is any non-volatile storage such as, for example, a magnetic disk drive. Off-aircraft processing 20 is any processing and analysis performed on data stored in non-volatile storage 16 which may be performed at, for example, a repair station.

Configuration data 12 may define, among other things, trigger events, identifiers indicating data elements to be stored, and data capture periods. Configuration data 12 may be in any electronic format, such as, for example, a configuration file in extensible markup language (XML). Configuration data 12 may be stored anywhere within embedded system 14. A trigger event is an event based upon any data that can be monitored by processor 20. For example, if processor 20 monitors, among other things, a temperature data element, and a speed data element, a trigger event could be defined such that the temperature is greater than a certain value and the speed is less than a certain value. Processor 20 will then continuously monitor the temperature data element and the speed data element for this condition and indicate when the condition has been met. The data capture period defines the time period for which the data captured is stored in volatile memory 22.

The identifiers indicating the data elements to be stored define which elements monitored by processor 20 should be stored in volatile memory 22. Processor 20 may receive inputs from, among other things, sensors and other diagnostic systems. These inputs can be processed and stored to memory by processor 20. These elements may include, but are not limited to, the elements used to detect the trigger event. Along with the data elements to be stored, configuration data 12 may include a frequency at which to store each element. For example, configuration data 12 may indicate that a first data element is to be stored once every millisecond, while a second data element is to be stored once every five milliseconds. The first data element would therefore be stored at a rate five times greater than that of the second data element.

Ring buffers may be implemented by processor 20 in volatile memory 22 to store data elements associated with a given trigger event. Ring buffers are circular first in first out (FIFO) buffers. Data is continuously stored in ring buffers and when the buffer is full, the oldest data is overwritten with the newest data. The size of each ring buffer is based upon, among other things, the identifiers indicating the data elements to be stored, the data capture period, the frequency at which to store data elements defined by configuration data 12, the size of volatile memory 22, and the size of non-volatile storage 16.

The following is a simplified, non-limiting example of configuration data in the form of a configuration file:

Trigger: (x>50 and y<40)>1.5 seconds;
Period: +5 seconds, −10 seconds;

Data_element_a 5 Hz;
Data_element_b 10 Hz;
Data_element_c 5 Hz;
Trigger: (z>100 and x>10)>50.0 seconds;
Period: +20 seconds, −5 seconds;
Data_element_a 10 Hz;
Data_element_d 10 Hz;
Data_element_e 5 Hz;

In this case, two trigger events are defined, with two corresponding data capture periods and sets of identifiers indicating data elements to be stored. A ring buffer may be implemented in volatile memory 22 by processor 20 for each trigger event and corresponding identifiers and frequencies. For the first set of data, processor 20 detects a trigger event when monitored value 'x' is greater than fifty, and monitored value 'y' is less than forty for one and a half seconds. The period is specified as +5 seconds and −10 seconds which means data is stored for five seconds after the trigger event, and for ten seconds prior to the trigger event, for a total of fifteen seconds. Thus, when processor 20 detects the trigger event, data will continue to be stored for five seconds before the contents of the ring buffer are copied to non-volatile storage 16. Data_element_a is stored at a frequency of five hertz, Data_element_b is stored at a frequency of ten hertz, and Data_element_c is stored at a frequency of five hertz. Therefore, a ring buffer is implemented in volatile memory 22 that can handle storing these three elements at these frequencies for the fifteen second time period.

For the second set of data, processor 20 detects a trigger event when monitored value 'z' is greater than one hundred, and when monitored value 'x' is greater than ten for fifty seconds. The period is specified as +20 seconds and −5 seconds which means data is stored for twenty seconds after the trigger event, and for five seconds prior to the trigger event, for a total of twenty-five seconds. Data_element_a (also indicated by the identifiers in the first set of data) is stored at a frequency of ten hertz, Data_element_d is stored at a frequency of ten hertz, and Data_element_e is stored at a frequency of five hertz. Data elements a-e are any elements that processor 20 can monitor, such as, for example, temperatures, air pressures, speeds, or any other environment data.

System 10' of FIG. 1B includes configuration data 12, embedded system 14', and off-aircraft processing 18. Embedded system 14' includes non-volatile storage 16', processor 20' and volatile memory 22'. Aside from locating non-volatile storage 16' within embedded system 14', the elements of system 10' are implemented in the same way as the elements in system 10 of FIG. 1A.

FIG. 2 is a data flow diagram illustrating ring buffer 30 and non-volatile memory 32 of data capture system 10. Ring buffer 30 may be implemented in volatile memory 22 of FIG. 1A. Non-volatile memory 32 may be implemented in non-volatile storage 16 of FIG. 1A. Digital data 34 and analog data 36 are representative of data elements monitored by processor 20 of FIG. 1A. Each location in ring buffer 30 can hold one instance of a data element. Each data element to be stored is stored at a current memory location tracked by processor 20. When data is stored to final memory location 40, processor 20 loops back around to initial memory location 38 and proceeds with storing data at that location. The total number of memory locations in ring buffer 30 is based upon the number of data elements to be stored, the frequency at which each data element is stored, and the period for which data is stored.

When processor 20 has detected a trigger event for the data stored in ring buffer 30, processor 20 continues storing data until the data capture period is complete, and then the contents of ring buffer 30 are copied to non-volatile memory 32. Each memory location of ring buffer 30 is copied to a corresponding memory location of non-volatile memory 32. The memory location for which the trigger event occurred is tracked in order to assist in analysis of the data. The memory location for which the trigger event occurred may be, for example, pre-identified, or indicated by processor 20 when storing data to non-volatile memory 32. This way, for example, a timeline may be reconstructed from the data in non-volatile memory 32 for data analysis. The data in non-volatile memory 32 may be accessed and analyzed at off-aircraft processing 18 of FIG. 1A in any way that is desired.

Figure 3:
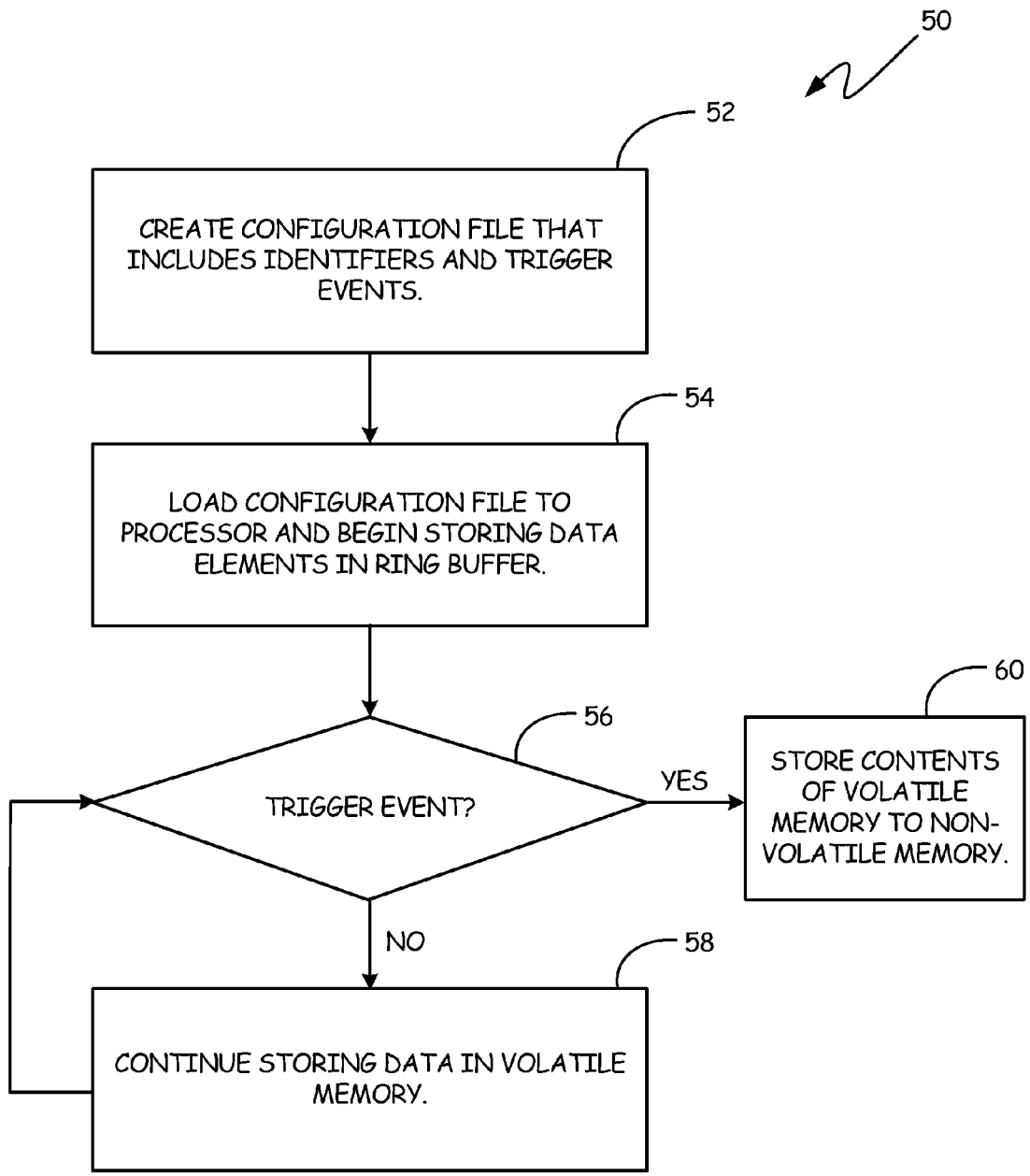
FIG. 3 is a flowchart illustrating a method of capturing data utilizing configuration data.

FIG. 3 is a flowchart illustrating method 50 of capturing data utilizing configuration data. At step 52, configuration data is created specifying, among other things, trigger events, data capture periods, identifiers indicative of data elements to be stored, and frequencies for which to store the data elements. At step 54, the configuration data is instructed to processor 20. Processor 20 creates a ring buffer in volatile memory for each trigger event and corresponding data to be stored. Processor 20 begins storing data in accordance with the configuration data in volatile memory 22. At step 56, processor 20 monitors for a trigger event as defined by the loaded configuration data. If a trigger event is detected, method 50 proceeds to step 60 and stores the contents of volatile memory 22 to non-volatile storage 16. If a trigger event is not detected, method 50 proceeds to step 58 and continues storing data to volatile memory 22. Method 50 returns to step 56 following step 58.

The following are non-exclusive descriptions of possible embodiments of the present invention.

A data capture system includes, among other things: a processor instructed by configuration data that indicates a trigger event and data identifiers, a volatile memory that stores data based upon the data identifiers, and a non-volatile memory that stores contents of the volatile memory based upon detection of the trigger event by the processor. The data identifiers indicate data elements to be stored.

The system of the preceding paragraph can optionally include, additionally and/or alternatively, any one or more of the following features, configurations and/or additional components:

The configuration data is defined in a configuration file. The processor is instructed by loading the configuration file to the processor.

The volatile memory is implemented as a ring buffer.

A size of the ring buffer is determined based upon the configuration data, a size of the volatile memory, and a size of the non-volatile memory.

The configuration data defines a data capture period.

The configuration data defines a frequency at which the data based upon the identifiers of the configuration data is stored.

The data stored comprises both analog and digital data.

A method of capturing data includes, among other things: configuring a processor using configuration data that defines a data capture event and identifiers, storing data based upon the identifiers in a volatile memory, and storing contents of the volatile memory to a non-volatile memory based upon the processor detecting an occurrence of the data capture event.

The method of the preceding paragraph can optionally include, additionally and/or alternatively, any one or more of the following features, configurations and/or additional components:

Configuring the processor includes loading a configuration file to the processor. The configuration file defines the configuration data.

The configuration data defines a data capture period.

Storing data based upon the identifiers includes storing the data based upon the identifiers at a frequency defined by the configuration data.

The volatile memory is implemented as a ring buffer.

A size of the ring buffer is based upon the configuration data, a size of the volatile memory, and a size of the non-volatile memory.

An embedded system includes, among other things: a processor instructed by configuration data that defines a trigger event and identifiers indicating data to be stored, and a volatile memory that stores data based upon the identifiers defined by the configuration data. The processor stores contents of the volatile memory to a non-volatile storage based upon detecting the trigger event.

The embedded system of the preceding paragraph can optionally include, additionally and/or alternatively, any one or more of the following features, configurations and/or additional components:

The configuration data is defined by a configuration file. The processor is instructed by loading the configuration file.

A ring buffer is implemented in the volatile memory.

A data capture period is defined by the configuration data for the trigger event.

The data based upon the identifiers is stored in the ring buffer following detection of the trigger event based upon the data capture period.

The identifiers include a frequency at which to store the indicated data.

A size of the ring buffer is based upon the data capture period, the identifiers defined by the configuration data, a size of the non-volatile memory, and a size of the volatile memory.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A data capture system comprising:
a processor instructed by configuration data that indicates a trigger event, a data capture period and data identifiers, wherein the data identifiers indicate data elements to be stored and a frequency at which to store the data identifiers, and wherein the data capture period is defined with respect to the trigger event;
a volatile memory that stores data based upon the data identifiers, wherein the volatile memory is allocated to store the data based upon the data capture period and the data identifiers; and
a non-volatile memory that stores contents of the volatile memory based upon detection of the trigger event by the processor.

2. The system of claim 1, wherein the configuration data is defined in a configuration file, and wherein the processor is instructed by loading the configuration file to the processor.

3. The system of claim 1, wherein the volatile memory is implemented as a ring buffer.

4. The system of claim 3, wherein a size of the ring buffer is determined based upon the configuration data, a size of the volatile memory, and a size of the non-volatile memory.

5. The system of claim 1, wherein the data stored comprises both analog and digital data.

6. The system of claim 1, wherein the trigger event is defined with respect to the data identifiers.

7. A method of capturing data, the method comprising:
configuring a processor using configuration data that defines a data capture event, a data capture period and data identifiers, wherein the data identifiers indicate data elements to be stored and a frequency at which to store the data identifiers, and wherein the data capture period is defined with respect to the data capture event;
storing data based upon the data identifiers in a volatile memory, wherein the volatile memory is allocated to store the data based upon the data capture period and the data identifiers; and
storing contents of the volatile memory to a non-volatile memory based upon the processor detecting an occurrence of the data capture event.

8. The method of claim 7, wherein configuring the processor comprises loading a configuration file to the processor, wherein the configuration file defines the configuration data.

9. The method of claim 7, wherein the volatile memory is implemented as a ring buffer.

10. The method of claim 9, wherein a size of the ring buffer is based upon the configuration data, a size of the volatile memory, and a size of the non-volatile memory.

11. The method of claim 7, wherein the data capture event is defined with respect to the data identifiers.

12. An embedded system comprising:
a processor instructed by configuration data that defines a trigger event, a data capture period, data identifiers indicating data to be stored, and a frequency at which to store the data identifiers, wherein the data capture period is defined with respect to the trigger event;
a volatile memory that stores data based upon the data identifiers defined by the configuration data, wherein the volatile memory is allocated to store the data based upon the data capture period and the data identifiers; and
wherein the processor stores contents of the volatile memory to a non-volatile storage based upon detecting the trigger event.

13. The embedded system of claim 12, wherein the configuration data is defined by a configuration file, and wherein the processor is instructed by loading the configuration file.

14. The embedded system of claim 12, wherein a ring buffer is implemented in the volatile memory.

15. The embedded system of claim 14, wherein the data based upon the data identifiers is stored in the ring buffer following detection of the trigger event based upon the data capture period.

16. The embedded system of claim 15, wherein a size of the ring buffer is based upon the data capture period, the data identifiers defined by the configuration data, a size of the non-volatile memory, and a size of the volatile memory.

17. The embedded system of claim 12, wherein the trigger event is defined with respect to the data identifiers.

* * * * *